US007406196B2

(12) United States Patent
Albertelli et al.

(10) Patent No.: US 7,406,196 B2
(45) Date of Patent: Jul. 29, 2008

(54) METHODS AND SYSTEMS FOR AUTOMATIC DETECTION OF CORNERS OF A REGION

(75) Inventors: Lawrence E. Albertelli, Owego, NY (US); Nina Kung, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 809 days.

(21) Appl. No.: 10/804,965

(22) Filed: Mar. 19, 2004

(65) Prior Publication Data
US 2005/0207652 A1    Sep. 22, 2005

(51) Int. Cl.
    G06K 9/46    (2006.01)
(52) U.S. Cl. ................................... 382/199
(58) Field of Classification Search ............ None
    See application file for complete search history.

(56) References Cited

U.S. PATENT DOCUMENTS

| | | | | |
|---|---|---|---|---|
| 4,158,835 A | 6/1979 | Miura et al. | ............ | 340/146.3 |
| 4,783,825 A | 11/1988 | Hirose et al. | ............ | 382/1 |
| 5,103,489 A | 4/1992 | Miette | ............ | 382/48 |
| 5,841,881 A | 11/1998 | Iwakawa et al. | ............ | 382/101 |
| 5,933,523 A * | 8/1999 | Drisko et al. | ............ | 382/151 |
| 6,124,896 A | 9/2000 | Kurashige | ............ | 348/584 |
| 6,236,735 B1 | 5/2001 | Bjorner et al. | ............ | 382/101 |
| 6,343,139 B1 | 1/2002 | Finkelstein et al. | ............ | 382/101 |
| 6,377,698 B1 | 4/2002 | Cumoli et al. | ............ | 382/101 |
| 6,421,451 B1 | 7/2002 | Shiratsuchi et al. | ............ | 382/101 |
| 2001/0022854 A1* | 9/2001 | Yokoi | ............ | 382/199 |
| 2003/0118236 A1 | 6/2003 | Kung et al. | ............ | 382/180 |

FOREIGN PATENT DOCUMENTS

| | | |
|---|---|---|
| JP | 58223879 | 12/1983 |
| JP | 59214984 | 12/1984 |
| JP | 2001038303 | 2/2001 |

OTHER PUBLICATIONS

Palumbo, P.W. et al. (Jul. 1992) "Postal Address Block Location in Real Time." Computer 25(7), 34-42.
Deriche, R. et al. (1993) "A Computational Approach for Corner and Vertex Detection." Int'l J. of Computer Vision 10(2), 101-124. Available at http://citeseer.nj.nec.com/deriche92computational.html.
Chetverikov, D. et al. (Apr. 1999) "Detection of High Curvature Points in Planar Curves." Available at http://visual.ipan.sztaki.hu/corner/index.html.

* cited by examiner

*Primary Examiner*—Brian P. Werner
*Assistant Examiner*—Thomas M Redding
(74) *Attorney, Agent, or Firm*—Burns & Levinson LLP; Jacob N. Erlich; Orlando Lopez

(57) ABSTRACT

A method and system for detecting the corners of a region in an image.

24 Claims, 3 Drawing Sheets

METHODS AND SYSTEMS FOR AUTOMATIC DETECTION OF CORNERS OF A REGION

BACKGROUND OF THE INVENTION

This invention relates generally to methods and systems for recognizing features, and, more particularly, to methods and systems for automatic detection of corners of a region.

Detection of features is a common operation in computer vision and character recognition. Specifically, the detection of corners is a necessary operation in many computer vision and character recognition problems. In one application, the recognizing of the address in the delivery items (parcels), the detection of the address label is one necessary step. When the delivery item (parcel) is imaged in order to recognize (read) the address label, the image of the label is often randomly orientated. The need to identify the four corners of the image of an address label after finding the image of the label is critical to further processing and character segmentation.

Corner detection methods, which work directly at the gray scale level, have been developed. Some of these methods compute a local measure of cornerness defined as the product of a gradient magnitude and the rate of change of gradient direction. Corner detection based on grayscale gradient or local measures of cornerness would highlight any texture areas including addresses inside the label and other noisy regions. For images of address labels, it is extremely difficult to isolate an image of an address label on parcel images due to poor contrast and a cluttered background. Traditional corner detection techniques based on grayscale gradients fail to isolate the four corners of an address label due to similar gradients existing throughout the contextual image region.

There is also a need for a method for detecting the corners of an image of an address label in order to determine the orientation.

BRIEF SUMMARY OF THE INVENTION

A method and system for detecting the corners of an address label in cluttered images are disclosed.

The initial data for the method of this invention includes an image of a region of interest. In one embodiment, the region of interest is a substantially rectangular region of interest. The image of a substantially rectangular region of interest may be obtained, but not limited to, by the methods and apparatus described in U.S. patent application publication No. US2003/0118236 A1, which is incorporated by reference herein. The edges interior to the substantially rectangular region of interest are detected by an edge detection method. The detected edges are culled in order to obtain a reduced edge group, where the reduced edge group includes a number of points. A measure of cornerness is obtained for each one point from the reduced edge group. A number of candidate corner points are selected from the reduced edge group by applying a predetermined criterion. The region corner points are identified from the candidate corner points based on a predetermined relationship, such as a distance, between each candidate corner point and characteristic edge points of the substantially rectangular region of interest, such as edge centers and corners.

A system that implements the method of this invention includes one or more processors and one or more memories having computer code that causes the processor to execute the method of this invention.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

A method and system for detecting the corners of a region in cluttered images are disclosed hereinbelow.

Figure 1:
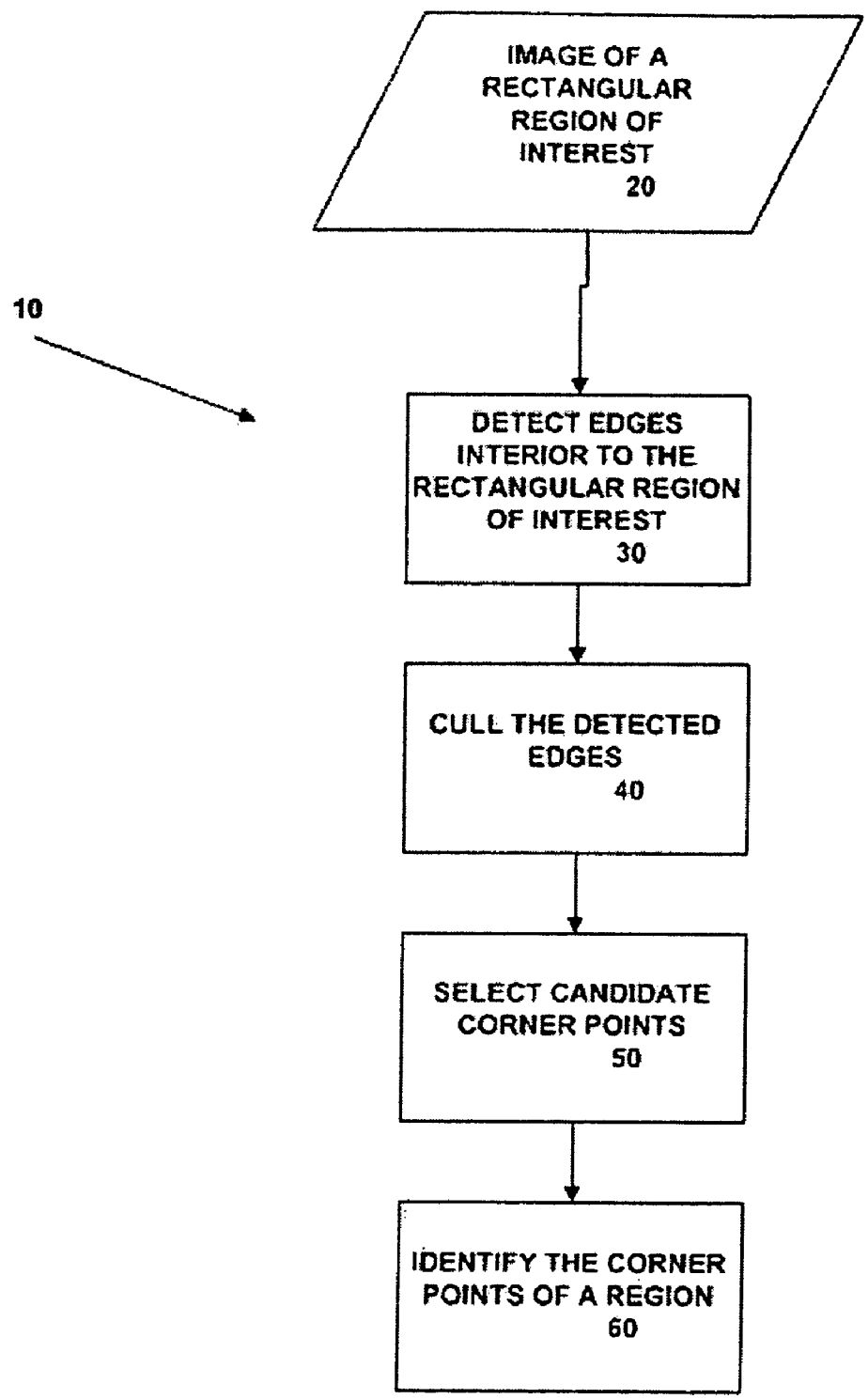
FIG. 1 depicts a flowchart of an embodiment of a method of this invention.

FIG. 1 depicts a flowchart of an embodiment of a method of this invention. Referring to FIG. 1, the initial data for the method of this invention includes an image of a substantially rectangular region of interest 20. The image of a rectangular region of interest may be obtained, but not limited to, by the methods and systems described in U.S. patent application publication No. US2003/0118236 A1. In the present invention, the edges of features interior to the rectangular region of interest are detected by an edge detection method (step 30, FIG. 1). Possible edge detection methods include, but are not limited to, gradient based methods, Laplacian based methods, Marr and Hildreth methods, and methods based on signal modeling (see, for example, J. S. Lim, *Two Dimensional Signal and Image Processing*, ISBN 0-13-935322-4, pp. 476-94). The detected edges are then culled in order to obtain a reduced edge group, where the reduced edge group includes a number of points (step 40, FIG. 1). Culling may be achieved, but not limited to, by masking a sub-set of the reduced edge group. Next, a number of candidate corner points are selected from the reduced edge group by applying a predetermined criterion. The predetermined criterion can include, but is not limited to, obtaining a measure of cornerness for each one point from the reduced edge group and comparing the measure of cornerness to a threshold (the measure of cornerness is also referred to as a measure of corner strength). Exemplary measures of cornerness include, but are not limited to, the measures defined by Beus and Tin, Kitchen and Rosenfeld, Freeman and Davis, Rosenfeld and Johnston, Rosenfeld and Weszka, and Zuniga and Haralick. (Short explanation of these measures and references can be found in Dmitry Chetverikov and Zsolt Szabó, *Detection of High Curvature Points in Planar Curves*, available at visual.ipan.sztaki.hu/corner/index.html and in Rachid Deriche, Girard Giraudon, *A computational approach for corner and vertex detection*, Int'l J. of Computer Vision, vol. 10, no. 2, pp. 101-124, 1993, available at citeseer.nj.nec.com/ deriche92computational.html.) Other exemplary corner detection methods include, but are not limited to, the methods of Chetverikov and Szabo, and Dresehier and Nagel (also described in the above cited references). The region corner points are identified from the candidate corner points based on a predetermined relationship, such as a distance, between each candidate corner point and characteristic edge points, such as edge centers and corners, of the rectangular region of interest (step 60, FIG. 1).

Once the predetermined relationship, such as a distance, between each candidate corner point and characteristic edge points of the rectangular region of interest, such as edge centers and corners, is known, it is possible to determine whether the region defined by the corner points is "tilted" with respect to the rectangular region of interest.

Figure 2:
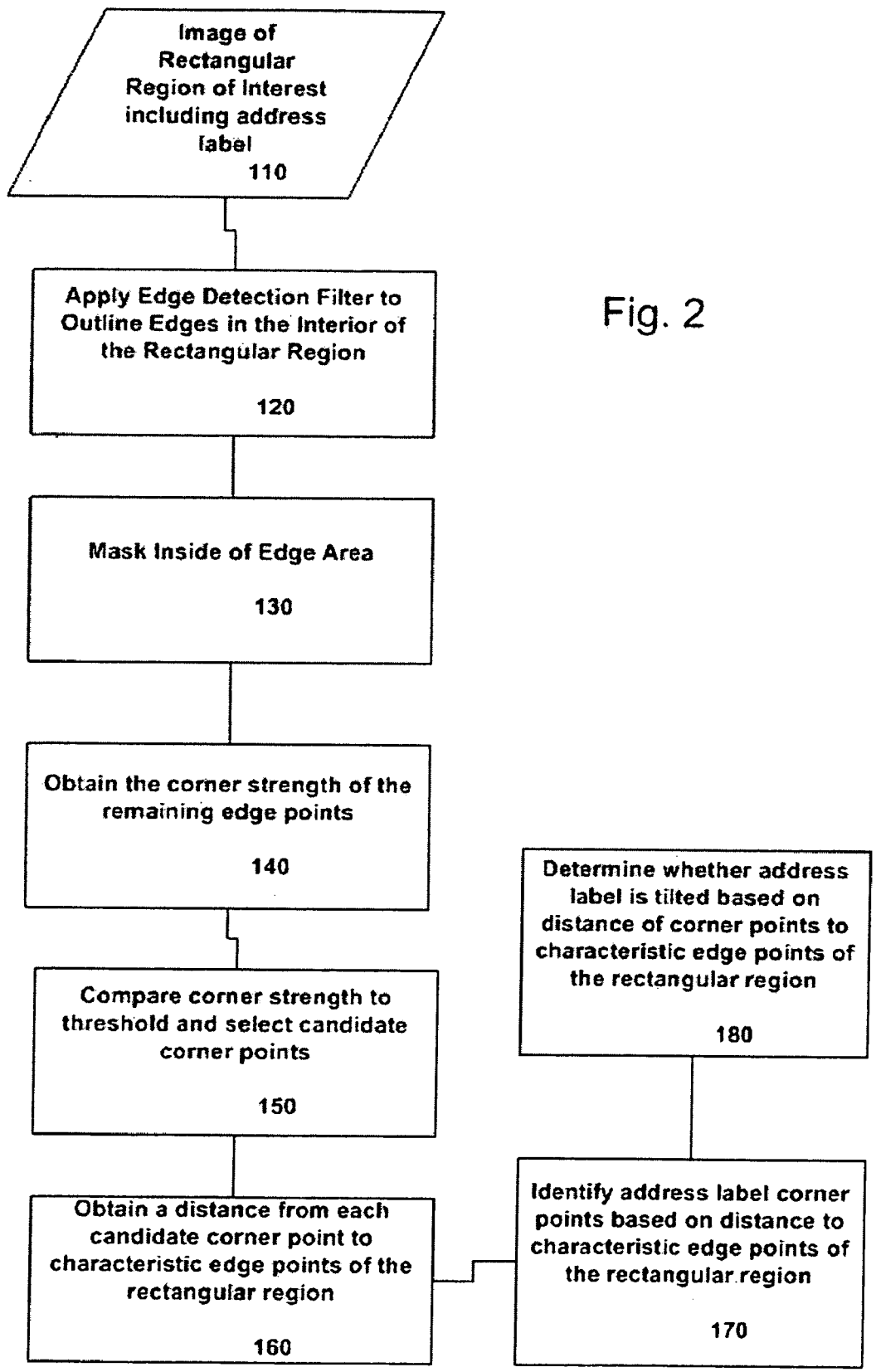
FIG. 2 depicts a flowchart of a detailed embodiment of the method of this invention; and, FIG. 3 is a schematic block diagram representation of a system of this invention.

In an embodiment of the method of this invention, the region, for which the corners need to be identified, is an image of an address label on a delivery item. A flowchart of the embodiment of the method of this invention for the detection of the corners of an image of an address label is shown in FIG. 2. Referring to FIG. 2, the initial data for this embodiment includes an image of the rectangular region of interest 110 including the address label. An edge detecting filter is applied to the pixels interior to the rectangular region of interest 110 in order to detect the edges interior to the rectangular region of interest 110 (step 120, FIG. 2). In one embodiment, the edge detecting filter is a Laplacian filter (for embodiments of Laplacian filters, see, for example, J. S. Lim, *Two Dimensional Signal and Image Processing*, ISBN 0-13-935322-4, pp. 483-86). The maximum and minimum coordinates of the detected edges defines an area interior to the rectangular region of interest 110. Applying a pre-selected offset to the boundaries of the defined interior area defines a masking area contained within the area interior to the rectangular region of interest 110. The masking area is then masked (step 130, FIG. 2). In one embodiment, masking can be described as multiplying the gray values of the points inside the masking area by zero. A measure of cornerness (corner strength) is obtained for the remaining (non-masked) edge points (step 140, FIG. 2). The corner strength for each of the remaining (non-masked) edge points is compared to a pre-selected threshold. The point is selected as a candidate corner point if the corner strength substantially equals or exceeds the threshold (step 150, FIG. 2). It should be noted that comparing to a threshold is tantamount to applying an ideal high pass filter. It should also be noted that a non ideal high pass filter, such as, but not limited to, a "fuzzy" threshold or a "fuzzy" classifier, could be used to select the candidate corner points. A distance from each candidate corner point to one or more of the characteristic edge points, such as the edge corner and edge midpoint, of the rectangular region of interest 110 is obtained for each candidate corner point (step 160, FIG. 2). Based on the distances from the candidate corner points to one or more of the characteristic edge points, address label corner points are identified from the candidate corner points (step 170, FIG. 2). Based on the distances from the candidate corner points to one or more of the characteristic edge points, it is possible to determine whether the address label is substantially located at an angle ("tilted") in relation to the rectangular region of interest (step 180, FIG. 2). (For example, but not limited to, address label corner points could clustered at edge midpoints, or two address label corner points could be closer to opposite edge corners.)

Figure 3:
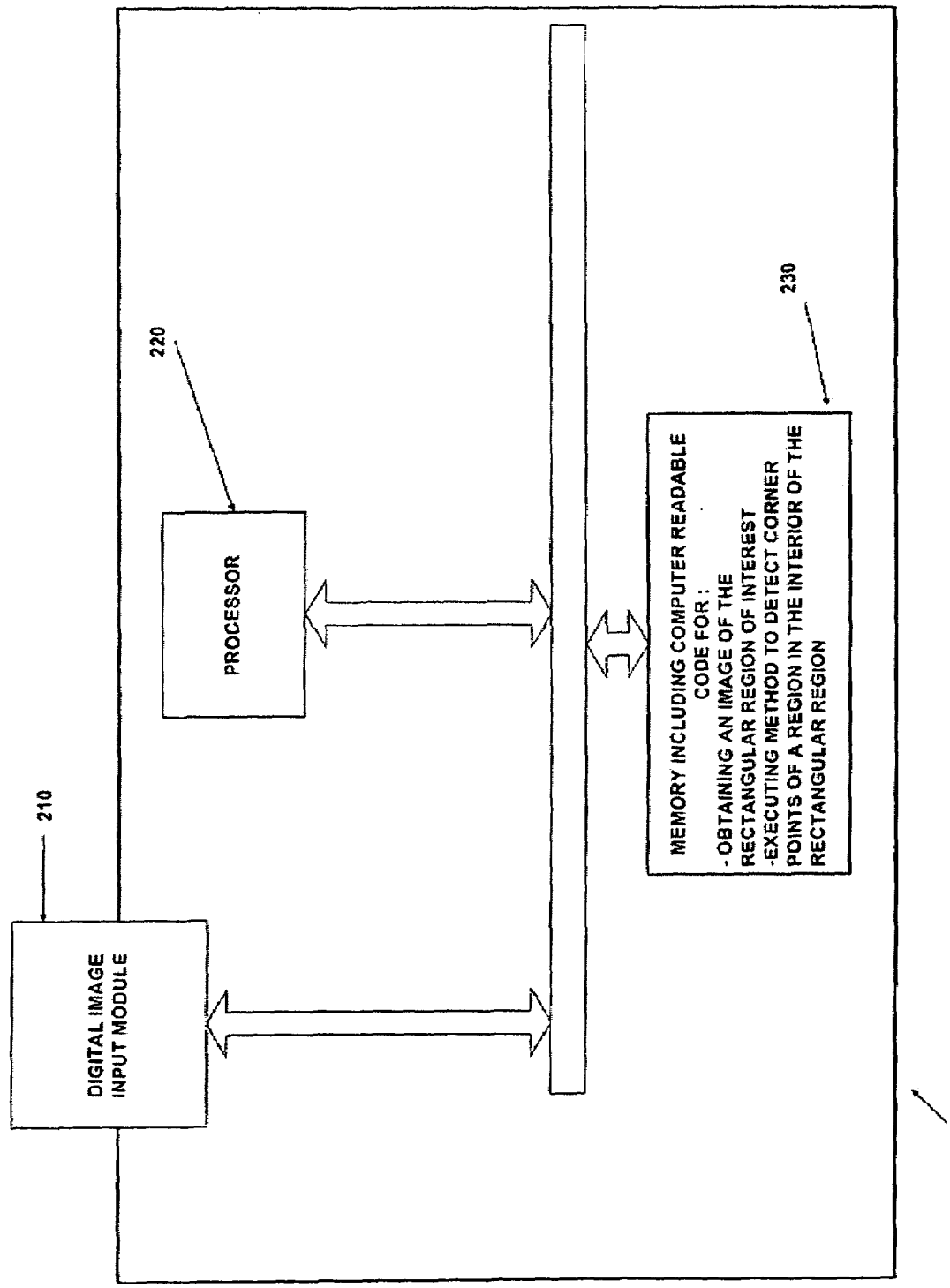

A block diagram representation of an embodiment of the system 200 of this invention is shown in FIG. 3. Referring to FIG. 3, the system 200 includes a digital image input module 210 capable of receiving a digital image of an item, one or more processors 220, and one or more computer readable memories 230. The one or more computer readable memories 230 have computer readable code embodied therein, which is capable of causing the one or more processors 220 to execute the above described methods of this invention. The computer readable code is capable of causing the one or more processors 220 to obtain an image of the rectangular region of interest 20. The image of the rectangular region of interest may be obtained, but not limited to, by the methods described in U.S. patent application publication No. US2003/0118236 A1, which is incorporated by reference herein. The computer readable code is also capable of causing the one or more processors 220 to detect edges of features interior to the rectangular region of interest 20, and to cull the detected edges in order to obtain a reduced edge group, where the reduced edge group includes a number of points. In one embodiment, the computer readable code is further capable of causing the one or more processors 220 to obtain a measure of cornerness for each point from the reduced edge group, to select candidate corner points from the reduced edge group by applying a predetermined criterion, and to detect region corner points from the candidate corner points based on a predetermined relationship between each candidate corner point and characteristic edge points of the rectangular region of interest. In another embodiment, the computer readable code is further capable of causing the one or more processors 220 to select candidate corner points from the reduced edge group by applying a corner detection method, and to detect region corner points from the candidate corner points as disclosed above. The computer readable code is also capable of causing the one or more processors 220 to determine whether the region defined by the corner points is substantially located at an angle in relation to the rectangular region of interest.

The computer code, in order to enable the detecting of edges, implements an edge detection method such as a gradient based method, a Laplacian based method, a Marr and Hildreth method, or a method based on signal modeling and equivalents. In order to cull the detected edges, the computer code includes instructions that implement methods that define an area interior to the rectangular region of interest by means of the maximum and minimum coordinates of the detected edges (that is, the coordinates of the edges closest to the boundaries of the rectangular region of interest). The computer code also includes instructions that implement methods that reduce the grayscale amplitude of edge points interior to the defined area, compares a threshold to the reduced amplitude and obtains a reduced edge group. In one embodiment, edge points in the interior of the defined area, which are not included within a threshold distance of the boundaries of the defined area, are masked. (This embodiment is equivalent to including in the reduced edge group only the edge points within a threshold distance of the boundaries of the defined area and the boundary points.)

In one embodiment, to obtain a measure of cornerness (corner strength), the computer code includes instructions that implement corner strength determination methods such as the measures defined by Beus and Tiu, Kitchen and Rosenfeld, Freeman and Davis, Rosenfeld and Johnston, Rosenfeld and Weszka, or Zuniga and Haralick, referred to above. In that embodiment, the computer code also includes instructions that implement methods that apply a predetermined criterion to the corner strength values to select candidate corner points from the reduced edge group. Examples of possible criteria, but not limited to, are comparing the corner strength values to a threshold, and applying a high pass filter. In another embodiment, the computer code includes instructions that implement corner detection methods such as, but are not limited to, the methods of Chetverikov and Szabo, and Dreschler and Nagel, also referred to above.

In order to detect the region corner points, the computer code includes instructions that implement methods that identify the region corner points from the candidate corner points based on a predetermined relationship, such as a distance, between each candidate corner point and characteristic edge points, such as edge centers and corners in the embodiment in which the region of interest is the rectangular region of interest. The computer code can include instructions that implement methods that determine whether the region defined by the corner points is "tilted" with respect to the rectangular region of interest.

It should be noted that, although FIG. 3, depicts that embodiment of the system of this invention as one system, the system of this invention could be implemented as two subsystems or distributed systems. In that embodiment, the digital image input module 210 capable of receiving a digital image of an item, one or more processors, and one or more computer readable memories are included in a first sub-system. The computer one or more computer readable memories in the first sub-system have computer readable code capable of causing the one or more processors of the first sub-system to obtain an image of the rectangular region of interest 20. The first sub-system provides the image of the rectangular region of interest 20 to a second sub-system. The second sub-system includes one or more processors, and one or more computer readable memories. The one or more computer readable memories in the second sub-system have computer readable code capable of causing the one or more processors of the second sub-system to execute the methods of this invention. The first and second sub-systems could be connected through one of a variety if available interconnection buses or input/output systems or via a remote network connection.

It should also be noted that although the method of this invention has been described with respect to a substantially rectangular region of interest, the method can be applied to regions of interest with various geometrical shapes. The method may be applied to regions of interest with other geometrical shapes by, but not limited to, generalizing the step of detecting the corner points from the candidate corner points.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. Input device, as used herein, refers to any device, such as, but not limited to, a keyboard, a mouse, voice input, a touch sensitive pad or display, a computer pen, or a writing tablet, that is used to provide input data to provide data to programmable computer. The output information may be applied to one or more output devices.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A method for detecting corners of a region, the method comprising the steps of:
    Establishing a region of interest bounded by characteristic edge points;
    detecting edges interior to the region of interest;
    culling the detected edges in order to obtain a reduced edge group from the detected edges, the reduced edge group comprising a plurality of points;
    selecting a plurality of candidate corner points based on a measure of cornerness obtained from the plurality of points; and
    detecting region corner points from the plurality of candidate corner points based on a predetermined relationship between each of the candidate corner points and the characteristic edge points of the region of interest.

2. The method of claim 1 wherein the step of detecting edges further comprises the step of applying an edge detection filter to an image of the region of interest.

3. The method of claim 2 wherein the edge detection filter comprises a Laplacian filter.

4. The method of claim 1 wherein the step of selecting a plurality of candidate corner points comprises the steps of:
    obtaining a measure of cornerness for each one point from the plurality of points;
    selecting the plurality of candidate corner points from the plurality of points by applying a predetermined criterion.

5. The method of claim 1 wherein the step of culling the detected edges further comprises the step of masking selected areas interior to the region of interest.

6. The method of claim 4 wherein the step of selecting a plurality of candidate corner points further comprises the steps of:
    comparing the measure of cornerness for each one point from the plurality of points to a predetermined threshold;
    selecting a point from the plurality of points as a candidate corner point if the measure of cornerness for said point is substantially equal to or greater than the predetermined threshold.

7. The method of claim 1 wherein the region of interest is a substantially rectangular region of interest.

8. The method of claim 7 wherein the step of detecting region corner points comprises:
    determining, for each candidate corner point from the plurality of candidate corner points, a distance from said each candidate corner point to at least one characteristic edge point from a plurality of characteristic edge points of the substantially rectangular region of interest; and
    wherein said predetermined relationship comprises said distance.

9. The method of claim 8 further comprising the step of:
    determining whether the region is substantially located at an angle in relation to the substantially rectangular region of interest.

10. The method of claim 1 wherein the region is an address label on a delivery item.

11. A system for detecting corners of a region comprising:
    means for establishing a region of interest bounded by characteristic edge points;
    means for detecting edges interior to the region of interest;
    means for culling the detected edges in order to obtain a reduced edge group from the detected edges, the reduced edge group comprising a plurality of points;

means for selecting a plurality of candidate corner points based on a measure of cornerness obtained from the plurality of points; and, means for identifying region corner points from the plurality of candidate corner points based on a predetermined relationship between each candidate corner point and the characteristic edge points of the region of interest.

12. The system of claim 11 wherein the means for detecting edges comprises means for applying an edge detection filter to an image of the region of interest.

13. The system of claim 11 wherein the means for culling the detected edges comprise means for masking selected areas interior to the region of interest.

14. The system of claim 11 wherein the means for selecting the plurality of candidate corner points comprise:

means for obtaining a measure of cornerness for each one point from the plurality of points;

means for selecting the plurality of candidate corner points from the plurality of points by applying a predetermined criterion.

15. The system of claim 14 wherein the means for selecting the plurality of candidate corner points further comprises:

means for comparing the measure of cornerness for each one point from the plurality of points to a predetermined threshold;

means for selecting a point from the plurality of points as a candidate corner point if the measure of cornerness for said point is substantially equal to or greater than the predetermined threshold.

16. The system of claim 11 further comprising:

means for determining, for each candidate corner point from the plurality of candidate corner points, a distance from said each candidate corner point to at least one characteristic edge point from a plurality of characteristic edge point of the region of interest; and wherein said predetermined relationship comprises said distance.

17. The system of claim 16 further comprising:

means for determining whether the region is substantially located at an angle in relation to the region of interest.

18. A computer program product comprising:

a computer readable memory having computer readable code embodied therein, the computer readable code capable of causing a computer system to:

establish a region of interest bounded by characteristic edge points;

detect edges interior to the region of interest;

cull the detected edges in order to obtain a reduced edge group from the detected edges, the reduced edge group comprising a plurality of points;

obtain a measure of cornerness for each one point from the plurality of points;

select a plurality of candidate corner points based on a measure of cornerness obtained from the plurality of points; and identify region corner points from the plurality of candidate corner points based on a predetermined relationship between each candidate corner point and the characteristic edge points of the region of interest.

19. The computer program product of claim 18 wherein the computer readable code capable of causing a computer system to detect edges is further capable of causing the computer system to:

apply an edge detection filter to an image of the region of interest.

20. The computer program product of claim 18 wherein the computer readable code capable of causing a computer system to cull the detected edges is further capable of causing the computer system to:

mask selected areas interior to the region of interest.

21. The computer program product of claim 18 wherein the computer readable code capable of causing a computer system to select a plurality of candidate corner points is further capable of causing the computer system to:

compare the measure of cornerness for each one point from the plurality of points to a predetermined threshold;

select a point from the plurality of points as a candidate corner point if the measure of cornerness for said point is substantially equal to or greater than the predetermined threshold.

22. The computer program product of claim 18 wherein the region of interest is a substantially rectangular region of interest.

23. The computer program product of claim 22 wherein the computer readable code capable of causing a computer system to identify region corner points is further capable of causing the computer system to:

determine, for each candidate corner point from the plurality of candidate corner points, a distance from said each candidate corner point to at least one characteristic edge point from a plurality of characteristic edge points of the substantially rectangular region of interest; and wherein said predetermined relationship comprises said distance.

24. The computer program product of claim 23 wherein the computer readable code is further capable of causing a computer system to:

determine whether a region defined by said region corner points is substantially located at an angle in relation to the substantially rectangular region of interest.

* * * * *